United States Patent Office 3,495,112
Patented Feb. 10, 1970

3,495,112
LOW-SPEED SYNCHRONOUS MOTOR
Alexandr Sergeevich Kurakin, Voronezh, U.S.S.R., assignor to Gosudarstvenny nauchno-issledovatelsky elektrotekhnichesky Institut, Voronezh, U.S.S.R.
Filed Aug. 8, 1967, Ser. No. 659,071
Int. Cl. H02k 21/26
U.S. Cl. 310—162                    3 Claims

ABSTRACT OF THE DISCLOSURE

Low-speed synchronous motor with electromagnetic speed reduction which comprises a ferromagnetic frame with end shields at least one of which is made of a ferromagnetic material, such shields rotatably supporting the motor shaft. A toothed stator with open slots is accommodated within the frame and an A.C. winding embraces the stator and defines a number of pairs of poles. At least one axially magnetized permanent magnet is disposed at least at one of the end shields and a toothed ferromagnetic rotor is mounted on said shaft within the stator and has open slots whose number exceeds that of the open slots of the stator by the number of the pairs of poles of the A.C. winding. A ferromagnetic tip may be mounted at the end of the permanent magnet and the tip can be provided with a cylindrical hole adapted for receiving a cylindrical projection on the rotor, whereby to form therewith an annular air gap.

---

The present invention relates to synchronous electric motors and, in particular, to low-speed synchronous motors provided with electromagnetic reduction of the speed of rotation of the motor shaft.

Known in the art is a low-speed synchronous motor with electromagnetic speed reduction comprising a stator and a rotor, the facing surfaces of which have open slots that serve for separating out the stator and the rotor tooth harmonics of the motor magnetic fields.

The stator magnetic fields of the above motor are excited by two stator windings having a different number of poles and connected to different sources of supply.

Electromagnetic speed reduction is brought about in the above-mentioned electric motor by the interaction of the rotor and stator tooth harmonics.

The known synchronous motor has several inherent disadvantages, among which are: its large physical size due to the arrangement of two windings on the stator of the motor; inefficient utilization of the electromagnetic properties of the active materials of the machine, which lowers its power capacity since the tooth harmonic spectrum of the field is not fully used for the working fields.

A primary object of the present invention is to provide a synchronous motor free from said disadvantages.

A still further object of the present invention is to provide a low-speed synchronous motor having an improved power capacity, small weight, reduced size, simple design and requiring a reduced amount of copper.

These and other objects of the present invention are attained by the development of an electric motor with a solid toothed rotor, wherein at least one of its end shields holds an axially magnetized permanent magnet that excites the rotor through an air gap provided between the end faces of the permanent magnet and the rotor.

Additionally, the end of the axially magnetized permanent magnet has a ferromagnetic tip with a cylindrical hole, whereas the rotor end facing the permanent magnet is provided with a cylindrical projection that is entered into the hole of the ferromagnetic tip, this combination forming an annular air gap.

It is recommended to make the frame and at least one end shield of the electric motor of a ferromagnetic material, and the motor shaft—of a non-magnetic material.

The present invention will further be described by way of example with reference to the accompanying drawings wherein.

Figure 1:
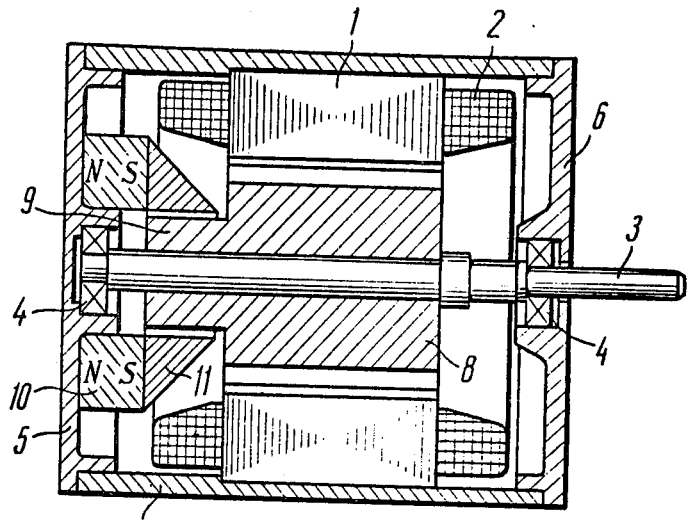
FIG. 1 shows a synchronous motor having a toothed stator with open slots carrying a winding and with a solid toothed rotor excited by an axially magnetized permanent magnet through an annular air gap provided between the ferromagnetic tip and the rotor projection in accordance with the present invention.

The electric motor shown in FIG. 1 consists of stator 1, winding 2, shaft 3 of a non-magnetic material, bearings 4, ferromagnetic end shield 5 and end shield 6, ferromagnetic frame 7 and toothed ferromagnetic rotor 8 with cylindrical projection 9. Axially magnetized permanent magnet 10 is used for exciting the electric motor. The magnetic flux set up by magnet 10 is directed into rotor 8 by ferromagnetic tip 11 through the annular air gap provided between tip 11 and projection 9 of rotor 8. Frame 7 and end shield 5 of the electric motor are made of a ferromagnetic material for passing the above-mentioned flux.

The inner surface of stator 1 has $Z_1$ open slots and the number $Z_2$ of slots of rotor 8 is determined from the following equation:

$$Z_2 = Z_1 + P \qquad (1)$$

where P is the number of pairs of poles of winding 2.

Synchronous running of the electric motor at a low speed is brought about due to the interaction of the tooth fields of rotor 8 excited by permanent magnet 10 and the field set up by winding 2 of stator 1. The speed of rotation of rotor 8 is equal to:

$$n = 60f/z_2 \text{ r.p.m.} \qquad (2)$$

According to Equation 1 an optimum overall utilization of the electric motor is attained.

Axially magnetized permanent magnet 10 ensures adequate excitation and synchronization of the electric motor at low speeds of rotation. Such a method of excitation of the electric motor provides for better utilization of the energy of the tooth fields of rotor 8 set up by permanent magnet 10, enables to reduce the size and weight of the machine, lower the magnetizing current of winding 2 and improve the efficiency of the electric motor by reducing the number of air gaps encountered by the magnetic flux of winding 2, this being achieved by arranging the two air gaps along the axis of the machine.

Figure 2:
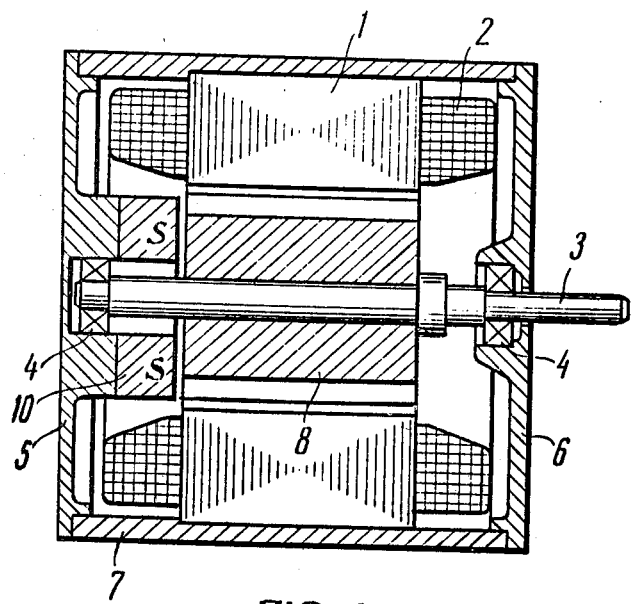
FIG. 2 shows a synchronous motor having a toothed stator with open slots carrying a winding and with a solid toothed rotor excited by an axially magnetized permanent magnet through an air gap provided between the end faces of the permanent magnet and the rotor, in accordance with the present invention.

The electric motor shown in FIG. 2 differs in that ferromagnetic tip 11 (FIG. 1) of permanent magnet 10 is not used in this case, and rotor 8 is excited through an air gap provided between the end faces of permanent magnet 10 and rotor 8. Such a simplification of the motor design enables to reduce the size and weight of the motor.

Figure 3:
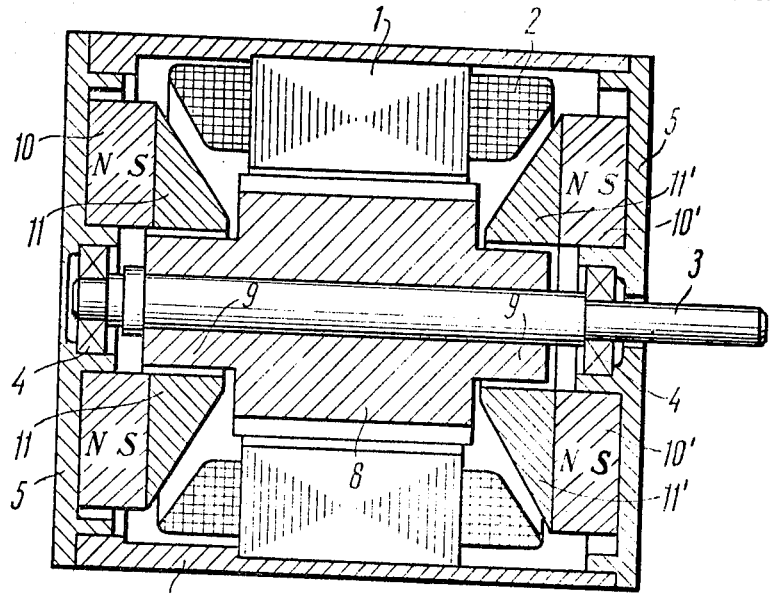
FIG. 3 shows a synchronous motor having an external toothed stator with open slots carrying a winding and with a solid toothed rotor excited by axially magnetized permanent magnets arranged at both sides of the rotor through annular air gaps provided between ferromagnetic tips and the rotor projections, in accordance with the present invention.

The electric motor shown in FIG. 3 differs from that presented in FIG. 1 in that it is fitted with an additional axially magnetized permanent magnet 10′ and an additional ferromagnetic tip 11′ and that both end shields 5 are made of a ferromagnetic material. The employment of two permanent magnets 10 and 10′ produces an axial magnetic symmetry that eliminates the undesirable axial forces and improve the power capacity of the electric motor.

Figure 4:
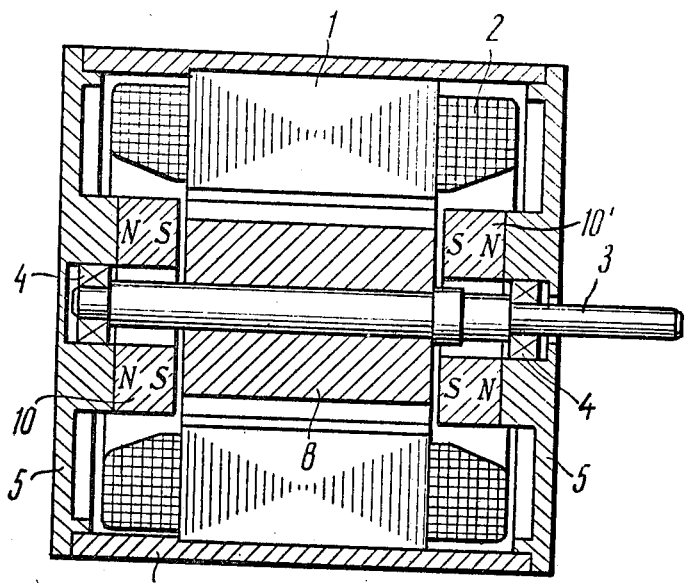
FIG. 4 shows a synchronous motor having an external toothed stator with open slots carrying a winding and with a solid toothed rotor excited by axially magnetized permanent magnets arranged at both sides of the rotor through air gap provided between the end faces of the permanent magnets and the rotor, in accordance with the present invention.

The electric motor shown in FIG. 4 differs from that shown in FIG. 2 in that rotor 8 is excited by two axially magnetized permanent magnets 10 and 10′ through air gaps provided at the end faces of rotor 8 and permanent magnets 10 and 10′. Both end shields 5 are made of a ferromagnetic material. This design is more simple than that shown in FIG. 3 and the use of two permanent magnets 10 and 10′ allows to obtain an axial magnetic symmetry of the motor and to improve its power capacity.

Low-speed synchronous motors with electromagnetic reduction of the speed of rotation of the motor shaft can be employed as low-speed synchronous drives in automatic control systems, radioelectronic devices, tape recorders, timers and other instruments. These motors are very reliable and have a long service life.

What I claim is:

1. A low-speed synchronous motor with electromagnetic speed reduction comprising a frame, end shields on said frame, a shaft rotatably mounted in said end shields, at least one axially magnetized permanent magnet disposed at least at one of said end shields; a toothed stator in said frame having open slots; an A.C. winding embracing said stator and defining a number of pairs of poles; and a toothed ferromagnetic rotor on said shaft and inside said stator, said rotor having open slots whose number exceeds that of the open slots of the stator by the number of the pairs of poles of the A.C. winding.

2. A low-speed synchronous motor as claimed in claim 1 in which the end of said permanent magnet is provided with a ferromagnetic tip having a cylindrical hole, said rotor having a cylindrical projection received in the hole of said ferromagnetic tip and forming therewith an annular air gap.

3. A low-speed synchronous motor as claimed in claim 2 in which said frame of the motor and at least one of said end shields are made of a ferromagnetic materials, said shaft being made of a non-magnetic material.

References Cited

UNITED STATES PATENTS 3,356,876    12/1967    Scholten _____ 310—162

FOREIGN PATENTS 846,202    8/1960    Great Britain.
1,211,131  3/1960    France.
1,237,875  6/1960    France.

J. D. MILLER, Primary Examiner

R. SKUDY, Assistant Examiner

U.S. Cl. X.R.

310—80, 83, 181